US012647375B2

(12) United States Patent
Yamaguchi

(10) Patent No.: US 12,647,375 B2
(45) Date of Patent: Jun. 2, 2026

(54) WORK SUPPORT SYSTEM, METHOD, AND INFORMATION STORAGE MEDIUM FOR UTILIZING CONVERSATIONAL CHATBOT IN MESSAGING SERVICES

(71) Applicant: Cybozu, Inc., Tokyo (JP)

(72) Inventor: Yohei Yamaguchi, Tokyo (JP)

(73) Assignee: CYBOZU, INC., Tokyo (JP)

( * ) Notice: Subject to any disclaimer, the term of this patent is extended or adjusted under 35 U.S.C. 154(b) by 50 days.

(21) Appl. No.: 18/991,755

(22) Filed: Dec. 23, 2024

(65) Prior Publication Data

US 2025/0219971 A1     Jul. 3, 2025

(30) Foreign Application Priority Data

Dec. 28, 2023     (JP) .................................. 2023-223513

(51) Int. Cl.
H04L 67/5681 (2022.01)
G06F 16/387 (2019.01)
H04L 51/02 (2022.01)

(52) U.S. Cl.
CPC ............ H04L 51/02 (2013.01); G06F 16/387 (2019.01)

(58) Field of Classification Search
CPC .................................. H04L 51/02; G06F 40/20
See application file for complete search history.

(56) References Cited

U.S. PATENT DOCUMENTS

| | | |
|---|---|---|
| 2019/0297032 A1 | 9/2019 | Zhang et al. |
| 2020/0304446 A1 | 9/2020 | Sasamae et al. |
| 2021/0243143 A1 | 8/2021 | Pham |
| 2022/0109644 A1 | 4/2022 | Zhang et al. |
| 2023/0376538 A1 | 11/2023 | Nagae et al. |
| 2024/0119238 A1* | 4/2024 | Samal ...................... G06F 40/30 |
| 2024/0333666 A1* | 10/2024 | Desmond ................ H04L 51/02 |

FOREIGN PATENT DOCUMENTS

| | | |
|---|---|---|
| JP | 2019164653 A | 9/2019 |
| JP | 2020154940 A | 9/2020 |
| JP | 2023170598 A | 12/2023 |

OTHER PUBLICATIONS

"NDI Solutions Group strengthens Microsoft Teams integration function of general-purpose AI chatbot CB3-Realizing response to inquiries within a team and automatic response requests to experts-" NDI Solutions Ltd., Jul. 7, 2022, the Internet, online, URL: https://www.ndisol.jp/news/2022/07/07.html (Retrieved on Aug. 15, 2024), pp. 1-13 (See Computer generated English translation).

(Continued)

*Primary Examiner* — Hee Soo Kim
(74) *Attorney, Agent, or Firm* — HEA Law PLLC

(57) ABSTRACT

Provided is a work support system including at least one processor configured to: acquire posted data indicating a post that has been made on a communication tool that supports work; determine, based on the posted data, whether a mention of an artificial intelligence (AI) has been made; acquire prompt data indicating a prompt provided in advance; cause, when it is determined that the mention has been made, the AI to generate answer data indicating an answer to the post based on the posted data and the prompt data; and display the answer on the communication tool based on the answer data.

12 Claims, 9 Drawing Sheets

(56)          References Cited

OTHER PUBLICATIONS

"Let's try linking the Slack app with ChatGPT." Tech Blog by GMO, GMO Internet Group, Inc., Apr. 17, 2023, the Internet, online, <URL: https://techblog.gmo-ap.jp/2023/04/17/connecting-slack-app-with-chatgpt/ (Retrieved on Aug. 15, 2024), pp. 1-20 (Computer generated English translation).
Office Action of Aug. 20, 2024, for corresponding JP Patent Application No. 2023-223513, pp. 1-4.

* cited by examiner

10

SERVER    100

DATA STORAGE UNIT

USER DATABASE —— DB1

COMMUNICATION TOOL DATABASE —— DB2

PROMPT DATA —— PD

POSTED DATA ACQUISITION MODULE —— 101

MENTION DETERMINATION MODULE —— 102

PROMPT DATA ACQUISITION MODULE —— 103

ANSWER DATA GENERATION MODULE —— 104

ANSWER DISPLAY MODULE —— 105

20

USER TERMINAL

DATA STORAGE UNIT —— 200

DISPLAY CONTROL MODULE —— 201

OPERATION RECEPTION MODULE —— 202

| USER ID | PASSWORD | USER NAME DATA | USER ATTRIBUTE DATA |
|---------|----------|----------------|---------------------|
| u00001 | ****** | USER U1 | DEVELOPMENT DEPARTMENT, CHIEF... |
| . . . | . . . | . . . | . . . |

| THREAD ID | POSTED DATA |
|-----------|-------------|
| s00001 | @User U1<br>THE TREND OF PROGRAMMING LANGUAGES IS CONSTANTLY CHANGING, BUT AS OF 2023, SEVERAL LANGUAGES ARE ATTRACTING ATTENTION. FOR EXAMPLE, THE FOLLOWING FIVE LANGUAGES ARE... |
| | @bot<br>I WILL EXPLAIN TRENDING PROGRAMMING LANGUAGES TO THE MANAGER AT THE REGULAR MEETING NEXT WEEK. PLEASE TELL ME ABOUT SOME TRENDING PROGRAMMING LANGUAGES. |
| | . . . |
| . . . | . . . |

Figure 7:
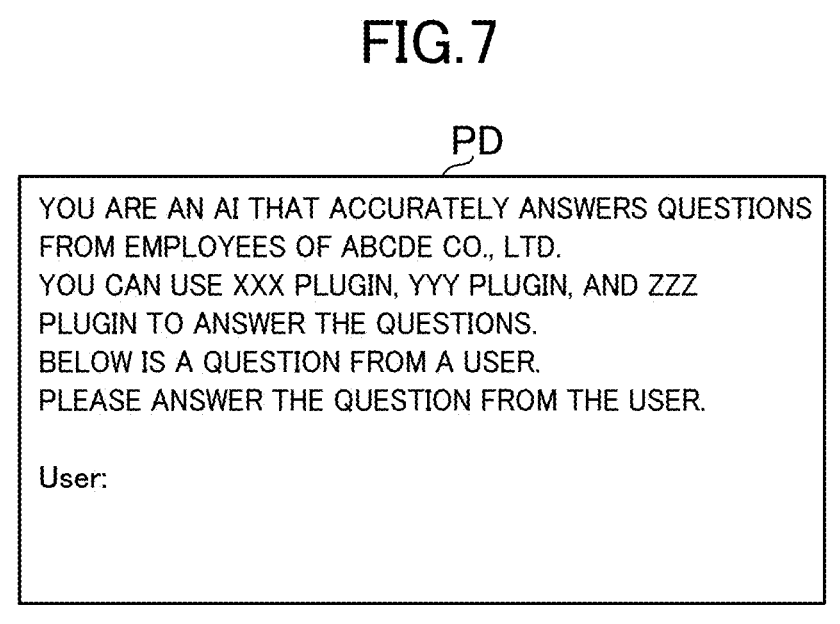

YOU ARE AN AI THAT ACCURATELY ANSWERS QUESTIONS
FROM EMPLOYEES OF ABCDE CO., LTD.
YOU CAN USE XXX PLUGIN, YYY PLUGIN, AND ZZZ
PLUGIN TO ANSWER THE QUESTIONS.
BELOW IS A QUESTION FROM A USER.
PLEASE ANSWER THE QUESTION FROM THE USER.

User:

WORK SUPPORT SYSTEM, METHOD, AND INFORMATION STORAGE MEDIUM FOR UTILIZING CONVERSATIONAL CHATBOT IN MESSAGING SERVICES

CROSS-REFERENCE TO RELATED APPLICATION

The present disclosure contains subject matter related to that disclosed in Japanese Patent Application JP 2023-223513 filed in the Japan Patent Office on Dec. 28, 2023, the entire contents of which are hereby incorporated by reference.

BACKGROUND OF THE INVENTION

1. Field of the Invention

The present disclosure relates to a work support system, a work support method, and an information storage medium.

2. Description of the Related Art

Hitherto, there has been investigated a technology for causing an artificial intelligence (AI) such as a large language model to support work of users. For example, in Japanese Patent Application Laid-open No. 2023-170598, there is described a conversational chatbot that searches a sentence collection in which a plurality of sentences as a search target are accumulated based on a character string input by a user on a conversation screen for the user to chat with a chatbot, which is an example of the AI, to acquire one or more search result sentences matching the character string, and presents the search result sentences to the user.

However, in the technology of Japanese Patent Application Laid-open No. 2023-170598, when the user is to search the sentence collection through use of the chatbot while communicating with other users through use of a communication tool that supports work, the user is required to open a dedicated conversation screen in addition to the communication tool to chat with the chatbot. For that reason, the technology of Japanese Patent Application Laid-open No. 2023-170598 has not been able to sufficiently increase convenience of the user.

SUMMARY OF THE INVENTION

One object of the present disclosure is to increase convenience of a user in a communication tool that supports work.

According to at least one aspect of the present disclosure, there is provided a work support system including at least one processor configured to: acquire posted data indicating a post that has been made on a communication tool that supports work; determine, based on the posted data, whether a mention of an artificial intelligence (AI) has been made; acquire prompt data indicating a prompt provided in advance; cause, when it is determined that the mention has been made, the AI to generate answer data indicating an answer to the post based on the posted data and the prompt data; and display the answer on the communication tool based on the answer data.

BRIEF DESCRIPTION OF THE DRAWINGS

FIG. 5 is a table for showing an example of a user database.

FIG. 6 is a table for showing an example of a communication tool database.

FIG. 7 is a view for illustrating an example of prompt data.

DESCRIPTION OF THE EMBODIMENTS

1. Hardware Configuration

Figure 1:
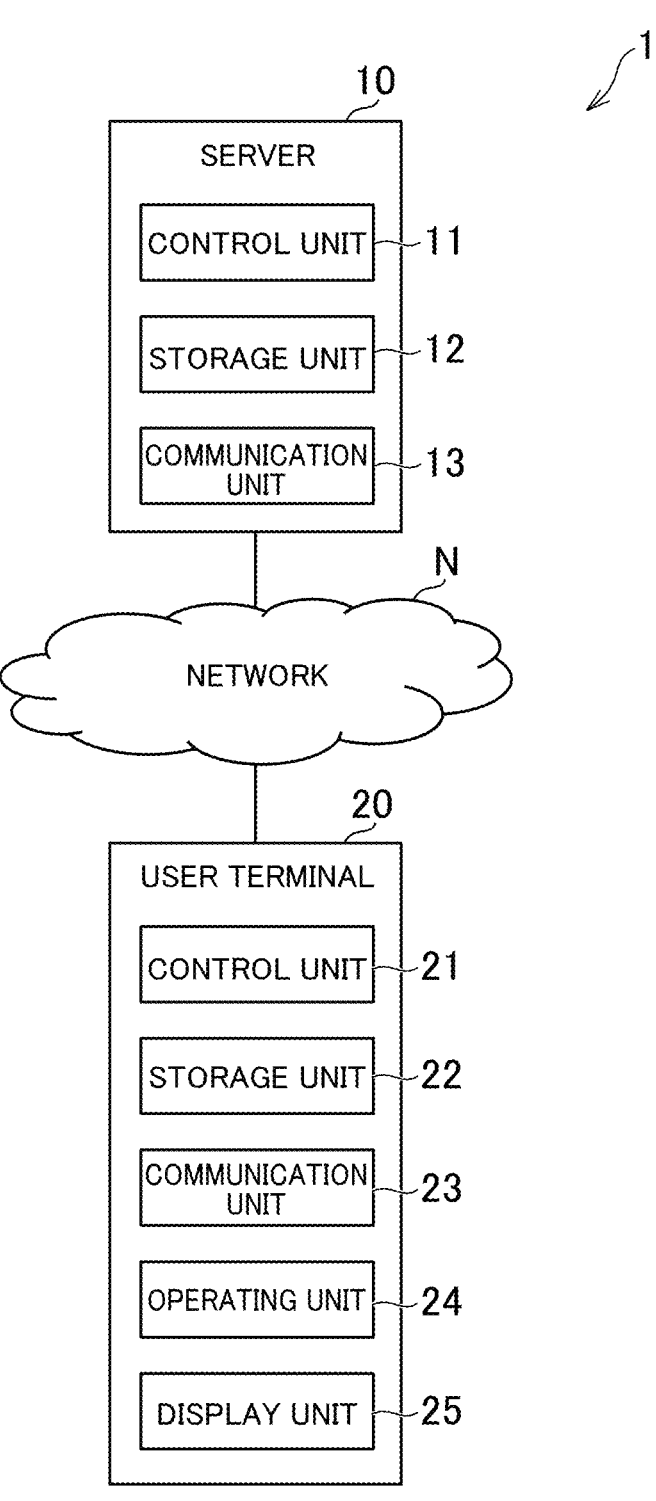
FIG. 1 is a diagram for illustrating an example of a hardware configuration of a work support system.

An example of a work support system, a work support method, and a program according to at least one embodiment of the present disclosure is described. FIG. 1 is a diagram for illustrating an example of a hardware configuration of the work support system. For example, a work support system 1 includes a server and a user terminal 20. The server 10 and the user terminal are each connected to a network N such as the Internet or a LAN.

The server 10 is a server computer. For example, the server 10 includes a control unit 11, a storage unit 12, and a communication unit 13. The control unit 11 includes at least one processor. The storage unit 12 includes at least one of a volatile memory such as a RAM, or a non-volatile memory such as a flash memory. The communication unit 13 includes at least one of a communication interface for wired communication or a communication interface for wireless communication.

The user terminal 20 is a computer of a user. For example, the user terminal 20 is a personal computer, a tablet terminal, a smartphone, or a wearable terminal. For example, the user terminal 20 includes a control unit 21, a storage unit 22, a communication unit 23, an operating unit 24, and a display unit 25. Hardware configurations of the control unit 21, the storage unit 22, and the communication unit 23 may be the same as those of the control unit 11, the storage unit 12, and the communication unit 13, respectively. The operating unit 24 is an input device such as a mouse or a touch panel. The display unit 25 is a liquid crystal display or an organic EL display.

Programs stored in the storage units 12 and 22 may be supplied via the network N. A hardware configuration of each of the server 10 and the user terminal 20 is not limited to the example of FIG. 1. For example, at least one of the server 10 or the user terminal 20 may include at least one of a reading unit (for example, a memory card slot) that reads a computer-readable information storage medium or an input/output unit (for example, a USB terminal) for directly connecting to an external device. A program stored in the information storage medium may be supplied to at least one of the server 10 or the user terminal through at least one of the reading unit or the input/output unit.

Moreover, the work support system 1 is only required to include at least one computer. The computers included in the work support system 1 are not limited to the example of FIG. 1. For example, the work support system 1 may include only the server 10. In this case, the user terminal 20 is present outside the work support system 1. The work support system 1 may include the server 10 and another server computer.

2. Overview of Work Support System

In the at least one embodiment, the work support system 1 has various functions that support work of users. For example, the work support system 1 may provide users with groupware of a cloud type or an on-premises type. The work support system 1, which is not classified as groupware, may provide users with a service that supports work. The work support system 1 according to the at least one embodiment includes a communication tool that supports work as one of the above-mentioned functions. The communication tool is a tool for a user to communicate with other users about matters relating to work.

In the at least one embodiment, conversation threading is described as an example of the communication tool, but the communication tool may be of another type. The communication tool is not limited to the conversation threading. Examples of the communication tool may include a bulletin board, an online chat, a comment function in the work support system 1, a message app, a social networking service (SNS), a short message service (SMS), and other tools that are not classified as conversation threading. In a case in which a type of database called an app having a comment function is provided to users, the comment function of the app may correspond to the communication tool.

For example, a user cooperates with other users in a team in an organization such as a company to carry out work. The user communicates with other users in the same team in relation to the work through use of the communication tool provided by the work support system 1. For example, when the user logs in to the work support system 1 and selects the communication tool, the user terminal 20 displays a communication tool screen indicating the communication tool on the display unit 25. In the at least one embodiment, a case in which the communication tool screen is displayed on a browser of the user terminal 20 is taken as an example.

Figure 2:
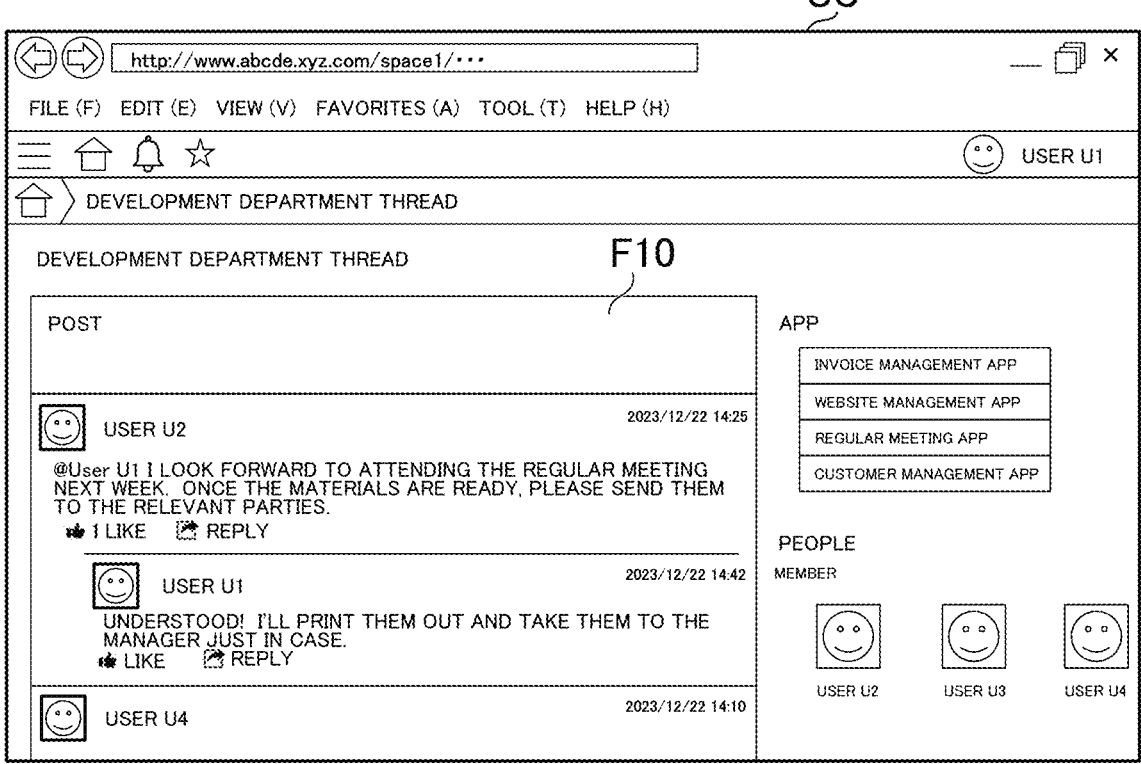
FIG. 2 is a view for illustrating an example of a communication tool screen.

FIG. 2 is a view for illustrating an example of the communication tool screen. As illustrated in FIG. 2, the user terminal 20 displays, on a communication tool screen SC, content of a thread selected by a user from among a plurality of threads created in the work support system 1. For example, on the communication tool screen SC, posts made to the thread are arranged in reverse chronological order. The posts correspond to content of communication. The posts can also be called messages or text. For example, each post is a character string, a file, a link, or a combination thereof. Each user can make a new post to a thread or post a reply to an existing post.

Figure 3:
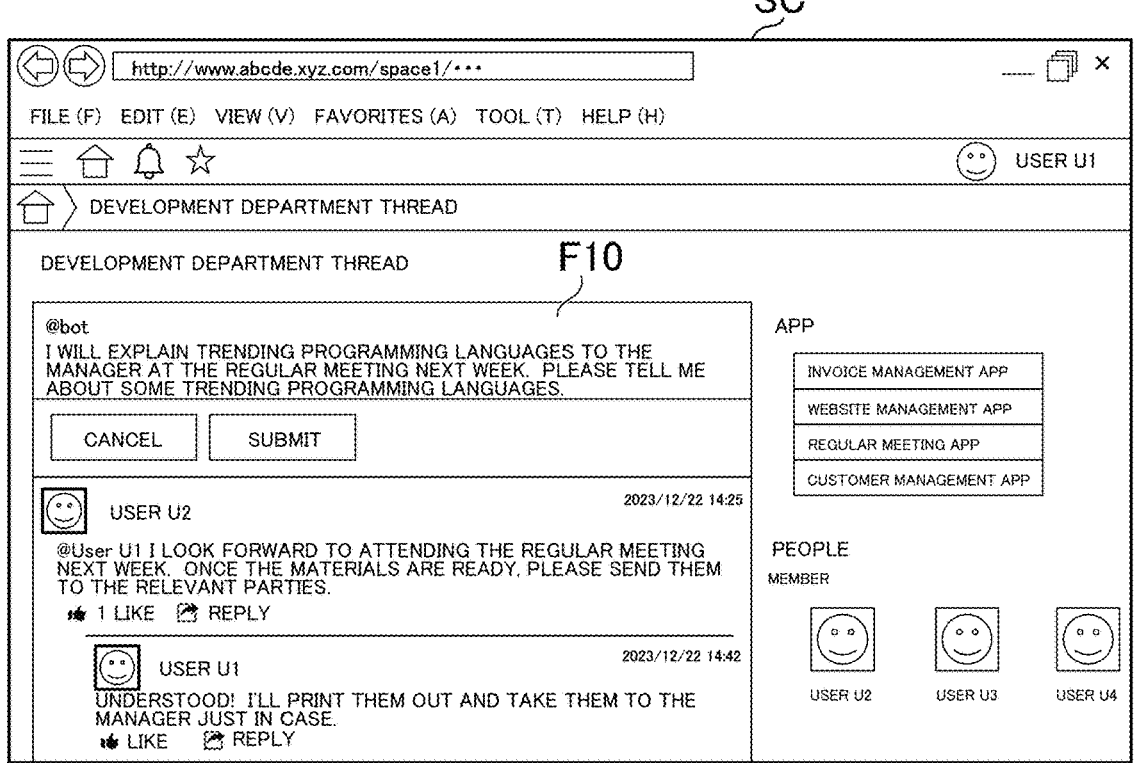
FIG. 3 is a view for illustrating an example of how a user makes a new post.
Figure 3:
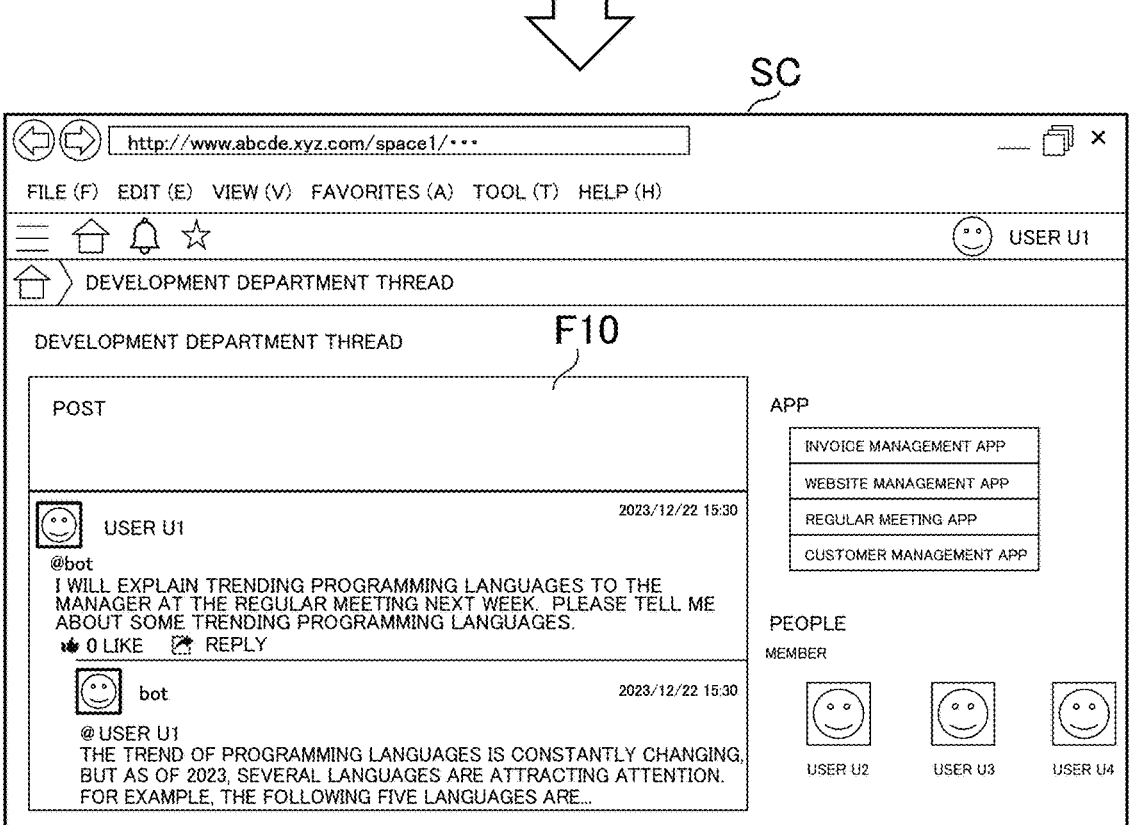

FIG. 3 is a view for illustrating an example of how a user makes a new post. As in the upper half of FIG. 3, the user inputs a new post in an input form F10. In the at least one embodiment, a user can mention another user by designating the other user. The mention serves as a notification to another user. For example, a user can mention another user by inputting information on the other user (for example, a name of the other user) after a specific symbol (for example, "@"). The mention is displayed on the screen of the other user. A mechanism of the mention may be the same as a publicly-known mechanism. For example, an email indicating the fact of having been mentioned may be sent to the other user who has been mentioned.

In the at least one embodiment, the user can mention an artificial intelligence (AI) by the same method as that of mentioning another user. The AI is a program having artificial intelligence that supports work of users. There are various views in terms of definitions of the AI, but the AI in the at least one embodiment may be an AI defined by any one of various publicly-known definitions. The AI may be an AI called a generative AI or a conversational AI. Examples of the AI may include a large language model, a machine learning model not classified as a large language model, a program called a bot, or other programs. There are also various views in terms of definitions of machine learning, but the machine learning in the at least one embodiment may be machine learning defined by any one of various publicly-known definitions. The machine learning may be any one of supervised learning, semi-supervised learning, or unsupervised learning.

In the at least one embodiment, a case in which the large language model corresponds to the AI is taken as an example. For example, the user can mention the AI by inputting a character string (for example, "bot") indicating the AI after a specific symbol (for example, "@") instead of inputting the information on another user thereafter. When the AI is mentioned, the server causes the AI to generate answer data indicating an answer to a post (in the example of the communication tool screen SC in the upper half of FIG. 3, the sentences "I will explain trending programming languages to the manager at the regular meeting next week. Please tell me about some trending programming languages.") of the user based on posted data indicating the post of the user and prompt data indicating a prompt provided in advance on the work support system 1 side.

For example, the server 10 transmits, to the user terminal 20, data for displaying the answer indicated by the answer data generated by the AI on the communication tool screen SC. As illustrated in the lower half of FIG. 3, the user terminal 20 displays the answer (in the example in the lower half of FIG. 3, the sentences "The trend of programming languages is constantly changing, but as of 2023, several languages are attracting attention. For example, the following five languages are . . . ") of the AI on the communication tool screen SC based on the data received from the server 10. In the answer of the AI, the user who has made the post may be mentioned. In the example in the lower half of FIG. 3, the user is mentioned by the character string "@UserU1" included in the answer of the AI.

As described above, in the work support system 1, when the user makes a post mentioning the AI on the communication tool, the AI generates answer data indicating an answer corresponding to the post of the user. On the communication tool, the answer of the AI is displayed. This eliminates necessity for the user to go back and forth between the communication tool and another tool for causing the AI to generate an answer, and hence the work support system 1 can increase convenience of the user. Details of the work support system 1 are described below.

3. Functions Implemented in Work Support System

Figure 4:
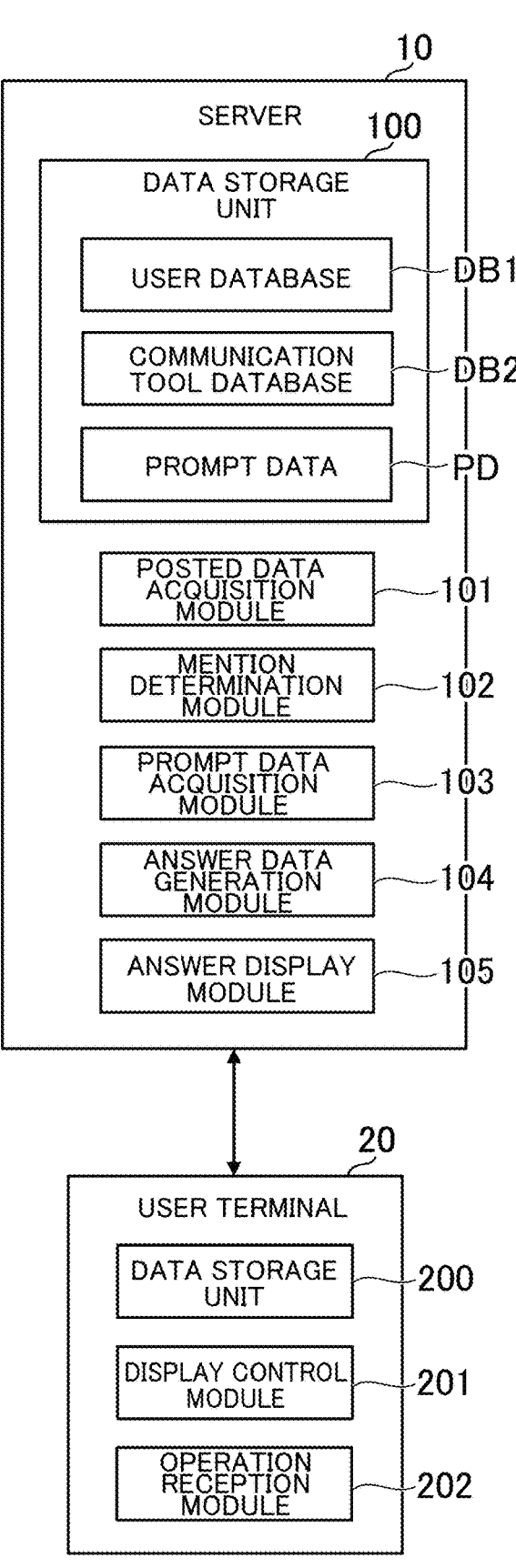
FIG. 4 is a diagram for illustrating an example of functions implemented in the work support system.

FIG. 4 is a diagram for illustrating an example of functions implemented in the work support system 1.

3-1. Functions Implemented in Server

For example, the server 10 includes a data storage unit 100, a posted data acquisition module 101, a mention determination module 102, a prompt data acquisition module 103, an answer data generation module 104, and an answer display module 105. The data storage unit 100 is implemented by the storage unit 12. Each of the posted data acquisition module 101, the mention determination module 102, the prompt data acquisition module 103, the answer data generation module 104, and the answer display module 105 is implemented by the control unit 11.

[Data Storage unit]

The data storage unit 100 stores data required for supporting work. For example, the data storage unit 100 stores a user database DB1 in which various kinds of data on users are stored, a communication tool database DB2 in which various kinds of data for the communication tool are stored, and prompt data PD indicating prompts provided in advance.

FIG. 5 is a table for showing an example of the user database DB1. For example, the user database DB1 stores a user ID, a password, user name data indicating a name of the user, and user attribute data. Any data may be stored in the user database DB1. The data stored in the user database DB1 is not limited to the example of FIG. 5. For example, the user database DB1 may store organization data indicating the organization to which the user belongs.

The user ID is an example of user identification data for the server 10 to identify the user. When the user ID is used for login, the user ID may also be called a user account. The user identification data may be other data such as an email address or a phone number. The password is used for authentication at a time of login. The name indicated by the user name data is used for mentioning the user. Other data such as the user ID may be used for mentioning the user. The user attribute data is data indicating attributes of the user. Details of the user attribute data are described in a modification example described later.

FIG. 6 is a table for showing an example of the communication tool database DB2. For example, the communication tool database DB2 stores a thread ID, which is an ID for identifying a thread, and posted data indicating a post to the thread. Any data may be stored in the communication tool database DB2. The data stored in the communication tool database DB2 is not limited to the example of FIG. 6. For example, the communication tool database DB2 may store the user ID of the user who has made the post, a posted date and time, the mentioned user or AI, data on a reaction to the post, and the like.

For example, when the user creates a new thread, the server issues a thread ID for the thread. When a new post is made to the thread, the posted data acquisition module 101 described later stores, in the communication tool database DB2, the issued thread ID and the posted data indicating the new post in association with each other. The posted data may include not only text indicating content of the post but also other data such as a file included in the post. In the at least one embodiment, it is assumed that the answer data indicating the answer from the AI is also stored in the communication tool database DB2 as a type of posted data, but the answer data may be stored in another database.

FIG. 7 is a view for illustrating an example of the prompt data PD. The prompt data PD indicates a default prompt provided in advance. A prompt is an instruction (input) to the AI. The post indicated by the posted data is also a type of prompt. In the at least one embodiment, a case in which the prompt data PD is provided by a business operator managing the work support system 1 is taken as an example. The prompt data PD may be provided by the user, or may be provided by an administrator in the organization to which the user belongs. In the example of the prompt data PD of FIG. 7, the post indicated by the posted data is inserted after "User:".

The data stored in the data storage unit 100 is not limited to the above-mentioned example. The data storage unit 100 can store any data. For example, the data storage unit 100 may store actual data of the AI. The actual data of the AI includes: a program indicating processing such as calculation of an embedded representation; and parameters to be referred to by the program. The actual data of the AI may include knowledge data indicating knowledge accumulated in the AI. It is assumed that training of a large language model, which is an example of the AI, has been completed, but the parameters can be adjusted by retraining such as fine-tuning. The AI may be stored in another computer other than the server 10. In this case, the server 10 communicates to/from the other computer to use the AI.

When the AI is a large language model as in the at least one embodiment, the AI may be any large language model. For example, the AI may be a transformer-based model such as ChatGPT or BERT, or may be another model that is not transformer-based. The AI may be a machine learning model that is not classified as a large language model. For example, the AI may be a model such as a generative adversarial network, a neural network, or a support vector machine. The AI may be a program that is not classified as a machine learning model such as a large language model. For example, the AI may be a rule-based AI, or may be a program that analyzes posts of users by natural language processing such as morphological analysis.

For example, the data storage unit 100 may store programs and data for the respective functions of the work support system 1. The data storage unit 100 may store a communication tool program and data such as data to be referred to by the program and data (for example, HTML data) for displaying the communication tool screen SC. The data storage unit 100 may store data for a function (for example, a schedule management function of managing a schedule of each user, a file management function of managing files of users, or an email management function of managing shared emails) other than the communication tool.

[Posted Data Acquisition Unit]

The posted data acquisition module 101 acquires the posted data indicating a post made on the communication tool that supports work. For example, the posted data acquisition module 101 acquires the posted data from the user terminal 20. In the example of the communication tool of FIG. 2 and FIG. 3, the posted data indicates posts input in the input form F10 by the user. The posted data indicates a character string input by the user. The posted data may indicate information other than a character string. Examples to be indicated by the posted data may include an emoji, a file, an image, a video, a link, and other information that are designated by the user.

For example, when the user makes a new post to a certain thread, the user terminal 20 transmits, to the server 10, the thread ID of the thread to which the new post has been made and the posted data indicating the new post. The posted data acquisition module 101 acquires the thread ID and the posted data from the user terminal 20. The posted data acquisition module 101 stores the thread ID and the posted data that have been acquired from the user terminal 20 in the communication tool database DB2 in association with each other. The posted data acquisition module 101 can acquire the posted data stored in the communication tool database DB2 at any timing.

[Mention Determination Module]

The mention determination module 102 determines whether or not a mention of the AI has been made based on the posted data. In the at least one embodiment, the mention determination module 102 determines, based on the posted data, whether or not a mention of the AI has been made by the same method as that of mentioning a user using the communication tool. The mention method may be a publicly-known method. In the at least one embodiment, a case in which a mention is made by inputting a character string indicating the name of the user after the specific symbol (for example, "@") is taken as an example. The mention may be made by a method using another symbol, or may be made by a method using an image such as a button without particularly inputting such a symbol.

For example, the mention determination module 102 determines whether or not a specific character string (for example, "bot") indicating a mention of the AI has been input after a specific symbol in the post indicated by the posted data. When the mention determination module 102 determines that a specific character string has not been input after the specific symbol, the mention determination module 102 does not determine that a mention of the AI has been made. When the mention determination module 102 determines that a specific character string has been input after the specific symbol, the mention determination module 102 determines that a mention of the AI has been made.

The mention determination module 102 may perform determination in accordance with the mention method defined by the communication tool. For example, when a mention of the AI is made by selecting a specific image or specific text displayed on the communication tool screen SC, the mention determination module 102 may determine whether or not a mention of the AI has been made by determining whether or not a specific image or specific text has been selected. The mention determination module 102 may determine whether or not a mention of the AI has been made by determining whether or not information in a specific format for indicating a mention of the AI is included in the posted data.

[Prompt Data Acquisition Unit]

The prompt data acquisition module 103 acquires the prompt data PD. In the at least one embodiment, the prompt data PD is stored in the data storage unit 100, and hence the prompt data acquisition module 103 acquires the prompt data PD from the data storage unit 100. The prompt data PD may be stored in another computer other than the server 10 or an external information storage medium. In this case, the prompt data acquisition module 103 acquires the prompt data PD from the other computer or the external information storage medium.

The prompt data PD may indicate any content as long as the prompt data PD indicates a default prompt. For example, the prompt data PD may indicate a name of the organization to which the user belongs, a type of data such as a plug-in that can be used by the AI, content of a task to be executed by the AI, a format of answer data, or a combination thereof. The prompt data PD may indicate not only a character string indicating the default prompt but also a character string (in the example of FIG. 7, "User:") indicating an insertion position of the post indicated by the posted data.

The prompt data PD may be provided for each thread. In this case, the data storage unit 100 stores the thread ID and the prompt data PD in association with each other. The prompt data acquisition module 103 acquires the prompt data PD associated with the thread ID of the thread to which the post indicated by the posted data has been made. The prompt data PD may be provided for each user or each organization instead of being provided for each thread. In this case, the data storage unit 100 stores the user ID or the organization ID and the prompt data PD in association with each other. The prompt data acquisition module 103 acquires the prompt data PD associated with the user ID or the organization ID of the user who has made the post indicated by the posted data.

[Answer Data Generation Module]

When it is determined that a mention has been made, the answer data generation module 104 causes the AI to generate answer data indicating an answer to the post based on the posted data and the prompt data PD. The answer data generation module 104 inputs each of the posted data and the prompt data PD to the AI. The answer data generation module 104 may insert the post indicated by the posted data into a prompt indicated by the prompt data PD and then input the prompt to the AI. The answer data generation module 104 acquires the answer data output from the AI.

Processing of the AI performed after the input to the AI is made may be publicly-known processing. When the AI is a large language model as in the at least one embodiment, the AI divides the input to itself into tokens based on learned parameters, and calculates the embedding representations of individual tokens based on the learned parameters. The token is a part of the input to the AI. The token includes at least one character. answer data indicating the answer The AI outputs the corresponding to a sequence of the embedded representations while predicting the next token as required based on the sequence of the embedded representations of the tokens. The above-mentioned series of processing is executed by a program included in the actual data of the AI. The above-mentioned series of processing may be publicly-known processing employed in a conversational AI or the like.

For example, when the AI is a machine learning model that is not classified as a large language model, the AI may calculate an embedded representation without particularly performing token division, and output the answer data indicating the answer corresponding to the embedded representation. When the AI is a program that is not a machine learning model, the AI may determine whether or not the input to itself matches a rule defined in advance without calculating an embedded representation, and output the answer data indicating the answer corresponding to an execution result of the determination. The above-mentioned series of processing is also executed by the program included in the actual data of the AI.

The answer data may have any format as long as the answer data indicates an answer from the AI. For example, the answer data may indicate sentences of the answer from the AI. When the AI generates an image as the answer, the answer data may indicate the image generated by the AI. When the AI acquires a file managed by the work support system 1 as the answer, the answer data may indicate the file. The answer data may indicate a combination of two or more of text, an image, and a file.

In addition, the AI can process any task based on the post of the user. In the example of FIG. 3, providing information to the user by the AI corresponds to the task. The task may be any task that can be processed by a publicly-known AI. For example, the task may be a search for information stored in a database managed by the work support system 1, a search for information managed in an Internet encyclopedia, machine translation, creating a summary, generating sentences, generating an image, proofreading a post, or another task. Even when the user does not particularly designate a task, the AI may determine the task to be processed by itself.

[Answer Display Module]

The answer display module 105 displays the answer on the communication tool based on the answer data. The answer display module 105 displaying the answer on the communication tool means the answer display module 105 executing processing for displaying the answer on the communication tool screen SC. In the at least one embodiment, the answer display module 105 is implemented by the server 10, and hence the answer display module 105 displays the answer of the AI on the communication tool by transmitting display data for displaying the answer on the communication tool to the user terminal 20. The display data may be the same as the answer data, or may be separate data generated from the answer data.

The display data may have any format. The display data may be any data that is required for displaying some information on the communication tool screen SC. For example, when the communication tool screen SC is displayed on the browser, the display data may be data in a markup language such as HTML. When the communication tool screen SC is displayed on an application dedicated to the work support system 1, the display data may be data (for example, image data or text data) required for displaying some information on the application. In the example of FIG. 3, the answer display module 105 displays the answer from the AI as a reply to the post made by the user. The post of the user is also displayed on the communication tool screen SC by processing of the server 10.

3-2. Functions Implemented in User Terminal

For example, the user terminal 20 includes a data storage unit 200, a display control module 201, and an operation reception module 202. The data storage unit 200 is implemented by the storage unit 22. Each of the display control module 201 and the operation reception module 202 is implemented by the control unit 21.

[Data Storage Unit]

The data storage unit 200 stores data for the work support. For example, the data storage unit 200 stores a browser for displaying various screens of the work support system 1. For example, the data storage unit 200 stores a program dedicated to the work support system 1.

[Display Control Module]

The display control module 201 displays various screens in the work support system 1 on the display unit 25. For example, the display control module 201 displays, on the display unit 25, various screens such as the communication tool screen SC based on data received from the server 10.

[Operation Reception Module]

The operation reception module 202 receives various operations in the work support system 1. For example, the operation reception module 202 receives operations on various screens such as the communication tool screen SC. Data indicating the operation content received by the operation reception module 202 is transmitted to the server 10 as appropriate.

4. Processing Executed in Work Support System

Figure 8:
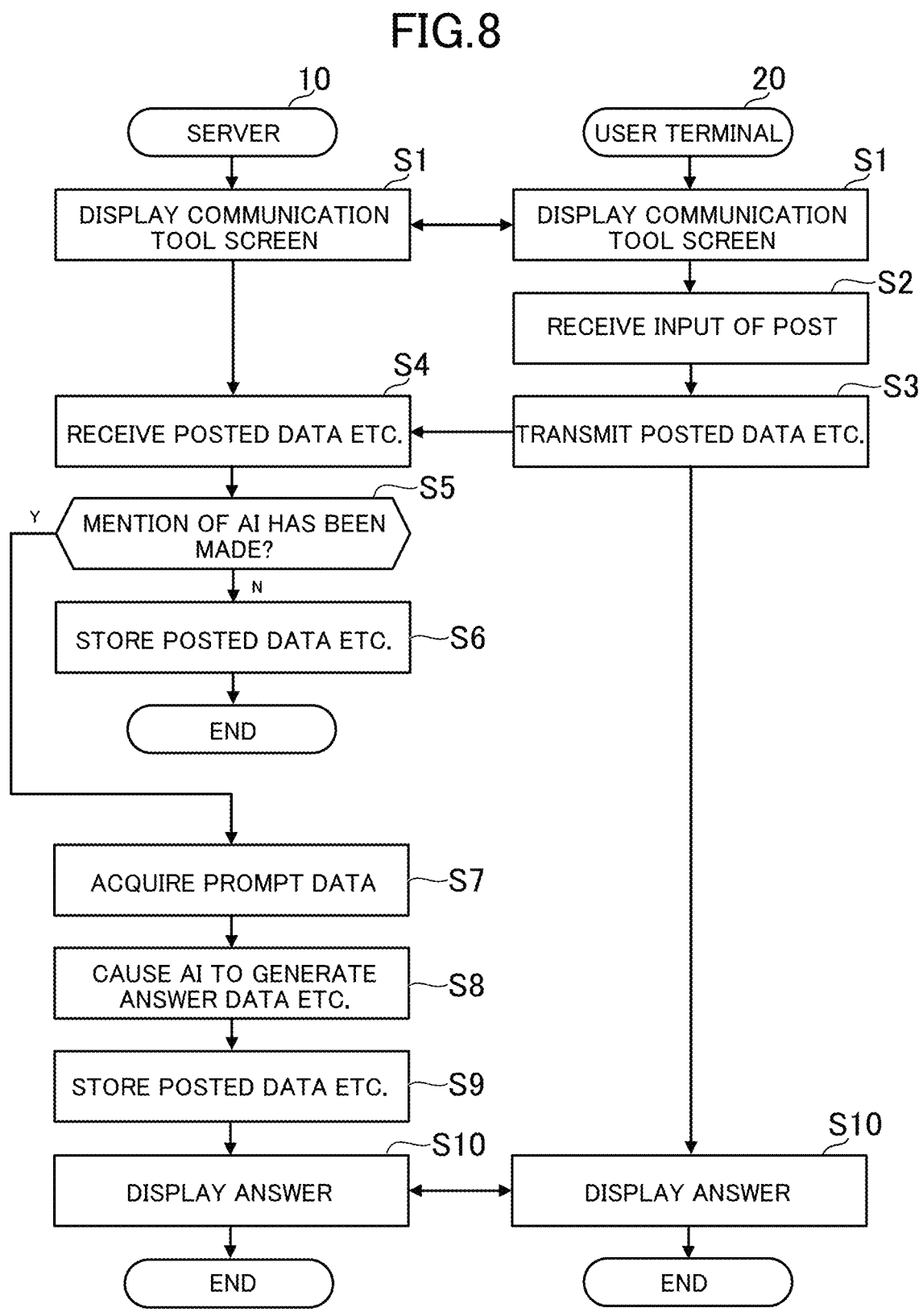
FIG. 8 is a flow chart for illustrating an example of processing executed in the work support system.

FIG. 8 is a flowchart for illustrating an example of processing executed in the work support system 1. The processing of FIG. 8 is executed by the control units 11 and 21 executing the programs stored in the storage units 12 and 22, respectively. The processing of FIG. 8 is executed when the user logs in to the work support system 1 and then selects a freely-selected thread on the communication tool.

The server 10 executes, between the server 10 and the user terminal 20, processing for displaying the communication tool screen SC indicating a thread selected by the user based on the communication tool database DB2 (Step S1). In Step S1, the server 10 generates display data (for example, HTML data) on the communication tool screen SC based on the posted data of existing posts in the thread, and transmits the generated display data to the user terminal 20. The user terminal 20 displays the communication tool screen SC as illustrated in FIG. 2 on the display unit 25 based on the display data. It is assumed that the display data also indicates the thread ID of the thread to be displayed.

The user terminal 20 receives input of a post to the input form F10 (Step S2). In Step S2, the user can make a post including the character string "@bot" for a mention of the AI, or can make a post that does not particularly include such a character string. When the user performs an operation for submitting a post, the user terminal 20 transmits, to the server 10, the thread ID of the thread being displayed and the posted data indicating the post input by the user (Step S3). The server acquires the thread ID and the posted data from the user terminal 20 (Step S4).

The server 10 determines whether or not a mention of the AI has been made based on the posted data (Step S5). In Step S5, the server 10 determines whether or not the character string "@bot" for a mention of the AI is indicated in the posted data. When it is not determined in Step S5 that a mention of the AI has been made (N in Step S5), the server 10 stores the thread ID and the posted data in the communication tool database DB2 in association with each other (Step S6), and this processing is finished. In this case, no answer data is generated by the AI. The processing step of Step S6 is the same as processing performed at a time of making a post in publicly-known conversation threading. When a mention of another user has been made, the server 10 executes processing for a mention of another user.

When it is determined in Step S5 that a mention of the AI has been made (Y in Step S5), the server 10 acquires the prompt data PD stored in advance (Step S7). The server 10 causes the AI to generate answer data based on the posted data and the prompt data PD (Step S8). In Step S8, the server 10 inserts the character string of the post indicated by the posted data into a predetermined position indicated by the prompt data PD, and then inputs the resultant to the AI. The AI executes processing such as the token division and the calculation of the embedded representations, and outputs the answer data. The server 10 acquires the answer data output from the AI.

The server 10 stores the thread ID and the posted data in the communication tool database DB2 in association with each other (Step S9). In Step S9, the server 10 stores the posted data of the post input by the user and the answer data generated by the AI in the communication tool database DB2. The server 10 executes, between the server 10 and the user terminal 20, processing for displaying the answer on the communication tool based on the answer data (Step S10), and the process ends. In Step S10, the server 10 generates display data on the communication tool screen SC indicating the post input by the user and the answer from the AI, and transmits the display data to the user terminal 20. The user terminal 20 displays the post input by the user and the answer from the AI on the communication tool screen SC based on the display data.

5. Summary of at Least One Embodiment

The work support system 1 according to the at least one embodiment determines whether or not a mention of the AI has been made based on the posted data. When it is determined that a mention of the AI has been made, the work support system 1 causes the AI to generate answer data based on the posted data and the prompt data PD. The work support system 1 causes the communication tool to output the answer based on the answer data. This eliminates necessity for the user to go back and forth between the communication tool and another tool for causing the AI to generate an answer, and hence the work support system 1 can increase the convenience of the user using the communication tool. For example, the user can ask a question to the AI on the communication tool while communicating with other users through the communication tool, and hence the work support system 1 can increase work efficiency of the user.

Further, the work support system 1 determines, based on the posted data, whether or not the mention of the AI has been made by the same method as a method of mentioning a user using the communication tool. This allows users to mention the AI with the same feeling as when mentioning another user, and hence the work support system 1 can effectively increase the convenience of the user.

6. Modification Examples

The present disclosure is not limited to the at least one embodiment described above. The present disclosure can be modified as required without departing from the purport of the present disclosure.

Figure 9:
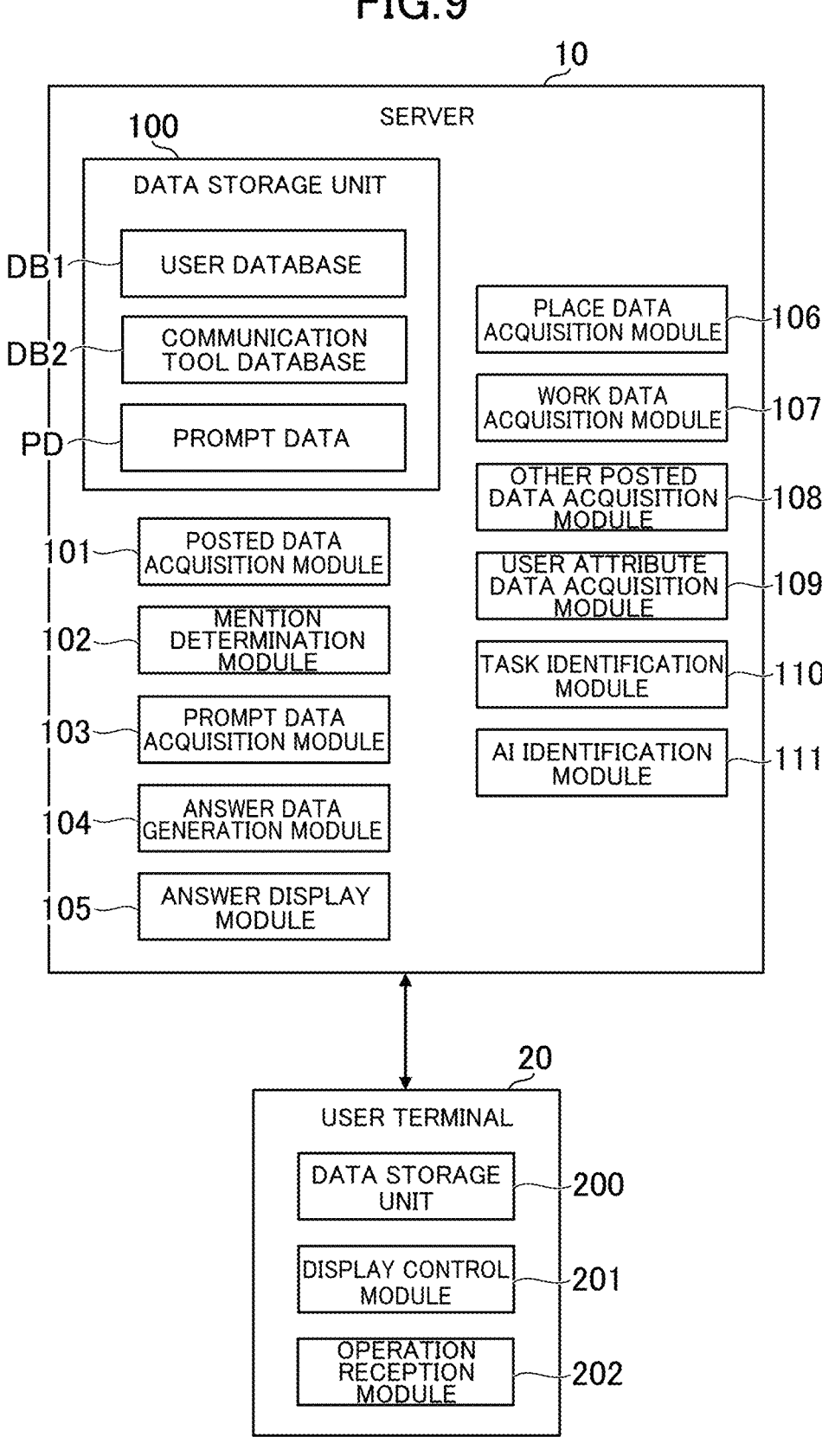
FIG. 9 is a diagram for illustrating an example of functions implemented in a work support system according to modification examples.

FIG. 9 is a diagram for illustrating an example of functions implemented in the work support system 1 according to modification examples. As illustrated in FIG. 9, in the modification examples described below, a place data acquisition module 106, a work data acquisition module 107, an other posted data acquisition module 108, a user attribute data acquisition module 109, a task identification module 110, and an AI identification module 111 are implemented. Each of the place data acquisition module 106, the work data acquisition module 107, the other posted data acquisition module 108, the user attribute data acquisition module 109, the task identification module 110, and the AI identification module 111 is implemented by the control unit 11.

6-1. Modification Example 1

For example, the user can post at any place on the communication tool. The place on the communication tool can also be said to be a group that collectively manages a plurality of posts. When the communication tool is the conversation threading, a thread to which a post has been made among a plurality of threads created on the communication tool corresponds to the place. When the communication tool is the online chat, a chat room to which a post has been made among chat rooms created on the communication tool corresponds to the place. In the same manner, for other communication tools, a group that collectively manages a plurality of posts may correspond to the place. The content to be answered by the AI may vary depending on the place in which the post has been made, and hence the AI may generate answer data also in consideration of the place in which the post has been made.

The work support system 1 according to Modification Example 1 includes the place data acquisition module 106. The place data acquisition module 106 acquires place data indicating the place in which the post has been made on the communication tool. For example, the place data acquisition module 106 acquires the place data from the user terminal 20. When the user inputs a post in a certain place, the user terminal 20 transmits the place data indicating the place along with the posted data. The place data may be included as part of the posted data. When the communication tool is the conversation threading, the place data is the thread ID. When the server 10 can identify a thread by the name of the thread, the place data may indicate the name of the thread. The place data may indicate an individual tree within the thread instead of the thread. In this case, the tree corresponds to the place.

The place data may be any data as long as the data indicates the place corresponding to the communication tool. For example, when the communication tool is the online chat, the place data may be an ID for identifying a chat room. In the same manner, for other communication tools, the place data may be any data that enables the server 10 to identify the place in which the post has been made. The place data acquisition module 106 may acquire such place data from the user terminal 20. When the place data indicating the place currently being viewed by the user is recorded in the data storage unit 100, the place data acquisition module 106 may acquire the place data from the data storage unit 100.

The answer data generation module 104 in Modification Example 1 causes the AI to generate answer data further based on the place data. For example, the answer data generation module 104 inputs the place data as the prompt for the AI. The AI calculates the embedded representation further based on the place data as well as the posted data and the prompt data PD. The AI outputs the answer data indicating the answer corresponding to the embedded representation. The answer data generation module 104 acquires the answer data output from the AI. Processing in which the answer display module 105 outputs the answer based on the answer data may be the same as that in the at least one embodiment.

A method by which the answer data generation module 104 acquires the answer data based on the place data is not limited to the above-mentioned example. It suffices that the answer data generation module 104 uses the place data in some way to cause the AI to generate answer data. For example, when the prompt data PD corresponding to the place data is provided, the answer data generation module 104 may acquire the prompt data PD associated with the place data and cause the AI to generate answer data based on the posted data and the prompt data PD. In another case, for example, when there are a plurality of AIs and an AI corresponding to each piece of place data is provided, the answer data generation module 104 may select the AI associated with the place data and cause the selected AI to generate answer data based on the posted data and the prompt data PD.

The work support system 1 according to Modification Example 1 causes the AI to generate answer data further based on the place data. This enables the work support system 1 to output an answer corresponding to the place in which the post has been made. The work support system 1 more easily outputs an answer desired by the user. For example, even in the same organization, appropriate content may differ between an answer to a post made to a thread for a development department and an answer to a post made to a thread for a sales department. Even when the posts are similar, the answer for the development department may be preferred to include content relating to development. The answer for the sales department may be preferred to include content relating to sales. The AI in Modification Example 1 can generate such answer data corresponding to each department, thereby increasing accuracy of the answer from the AI.

6-2. Modification Example 2

For example, work data relating to work of the users is registered in the work support system 1. The work data is data for the work support. Examples of the work data may include files uploaded by users, a database registered in the work support system 1, values of fields in the database, and other data. The AI may take those kinds of work data into consideration. The data storage unit 100 in Modification Example 2 stores the work data. For example, the data storage unit 100 stores, for each organization to which a user belongs, the work data relating to work in the organization.

The work support system 1 according to Modification Example 2 includes the work data acquisition module 107. The work data acquisition module 107 acquires the work data relating to the work of a user who has made a post. For example, when the user makes a post to a certain thread, the work data acquisition module 107 acquires files registered in the thread as work data. When the user makes a post through use of the comment function of a certain app, the work data acquisition module 107 acquires data of fields of the app as the work data. When the user makes a post to a specific record of a certain app, the work data acquisition module 107 acquires data of the record as work data. Those pieces of work data are stored in advance in the data storage unit 100, thereby enabling the work data acquisition module 107 to acquire the work data only by referring to the data storage unit 100.

The answer data generation module 104 in Modification Example 2 causes the AI to generate answer data further based on the work data. For example, the answer data generation module 104 inputs the work data as the prompt for the AI. The AI calculates the embedded representation further based on the work data as well as the posted data and the prompt data PD. The AI outputs the answer data indicating the answer corresponding to the embedded representation. The answer data generation module 104 acquires the answer data output from the AI. Processing in which the answer display module 105 outputs the answer based on the answer data may be the same as that in the at least one embodiment.

A method by which the answer data generation module 104 acquires the answer data based on the work data is not limited to the above-mentioned example. It suffices that the answer data generation module 104 uses the work data in some way to cause the AI to generate answer data. For example, when the prompt data PD corresponding to the work data is provided, the answer data generation module 104 may acquire the prompt data PD associated with the work data and cause the AI to generate answer data based on the posted data and the prompt data PD. In another case, for example, when there are a plurality of AIs and an AI corresponding to each piece of work data is provided, the answer data generation module 104 may select the AI associated with the work data and cause the selected AI to generate answer data based on the posted data and the prompt data PD.

The work support system 1 according to Modification Example 2 causes the AI to generate answer data further based on the work data. This enables the work support system 1 to output an answer corresponding to the work of the user. The work support system 1 more easily outputs an answer desired by the user. For example, when the AI generates answer data in consideration of the content of the files registered in the thread, the AI can generate answer data corresponding to the content relating to the work which has led up to the post made by the user. When the AI generates answer data in consideration of the data registered in a record of an app, the AI can generate answer data corresponding to the content of a record to which the user has made a post through use of the comment function of the app. As a result, the work support system 1 can display, on the communication tool screen SC, an answer that closely relates to the work relating to the post made by the user.

6-3. Modification Example 3

For example, in the communication tool, not only the post made by the user but also other existing posts may be present. When the conversation threading is taken as an example as in the at least one embodiment, the thread to which the user has made a post may have other existing posts. Similarly in other communication tools such as the online chat, at a time point at which the user makes a post, there may be other existing posts that have already been made. The other posts may include content relating to the post made by the user (for example, a topic of the work relating to the post made by the user), and hence the AI may generate answer data also in consideration of the other posts.

The work support system 1 according to Modification Example 3 includes the other posted data acquisition module 108. The other posted data acquisition module 108 acquires other posted data indicating other posts different from a post of interest. The other posts are existing posts. For example, when the user replies to some post, the post of a reply source corresponds to the other post. When the user makes a post to a certain thread, existing posts made to the certain thread correspond to the other posts. The other posted data is stored in the communication tool database DB2.

For example, the other posted data acquisition module 108 refers to the communication tool database DB2 to acquire the other posted data. Similarly when other communication tools such as the online chat are employed, the other posted data acquisition module 108 acquires the other posted data indicating other existing posts. The other posted data acquisition module 108 may acquire the other posted data for the entire past period, or may acquire the other posted data for a recent predetermined period (for example, one week). The other posted data acquisition module 108 may acquire the other posted data for the same place as the place in which the user has made the post. The answer data generation module 104 in Modification Example 3 causes the AI to generate answer data further based on the other posted data. For example, the answer data generation module 104 inputs the other posted data as the prompt for the AI. The AI calculates the embedded representation further based on the other posted data as well as the posted data and the prompt data PD. The AI outputs the answer data indicating the answer corresponding to the embedded representation. The answer data generation module 104 acquires the answer data output from the AI. Processing in which the answer display module 105 outputs the answer based on the answer data may be the same as that in the at least one embodiment.

A method by which the answer data generation module 104 acquires the answer data based on the other posted data is not limited to the above-mentioned example. It suffices that the answer data generation module 104 uses the other posted data in some way to cause the AI to generate answer data. For example, when the prompt data PD corresponding to the other posted data is provided, the answer data generation module 104 may acquire the prompt data PD associated with the other posted data and cause the AI to generate answer data based on the posted data and the prompt data PD. In another case, for example, when there are a plurality of AIs and an AI corresponding to each piece of other posted data is provided, the answer data generation module 104 may select the AI associated with the other posted data and cause the selected AI to generate answer data based on the posted data and the prompt data PD.

The work support system 1 according to Modification Example 3 causes the AI to generate answer data further based on the other posted data. This enables the work support system 1 to output an answer corresponding to not only the post made by the user but also other posts in the communication tool. The work support system 1 more easily outputs an answer desired by the user. For example, the other posts may indicate the process leading up to the post made by the user. Through generation of the answer data based on the other posted data, the AI can generate answer data corresponding to the process leading up to the post made by the user, thereby increasing the accuracy of the answer from the AI. For example, even when the post made by the user does not indicate the process leading up to the post, the AI can generate answer data corresponding to the process leading up to the post.

6-4. Modification Example 4

For example, the other posted data acquisition module 108 in Modification Example 3 may acquire other posted data of other posts in the same tree as that of the post indicated by the posted data acquired by the posted data acquisition module 101 among a plurality of other posts made on a communication tool. The tree is a collection of posts that have been made in reply to one another starting from a certain post. The tree is a collection of an originating post and reply posts made based on the originating post. The tree can also be said to be a collection of posts indicating the same topic.

It is assumed that a tree ID that can identify a tree is stored in the communication tool database DB2. For example, when the user makes a new post that does not quote another post, the server 10 generates a new tree ID and stores the tree ID in the communication tool database DB2. When a reply is made to the post, the server 10 associates the tree ID with the posted data of the reply post. This causes the original post and the reply post to belong to the same tree. Other communication tools such as the online chat may also support a similar tree structure.

For example, when the user makes a post to a certain tree, the other posted data acquisition module 108 acquires the tree ID of the tree to which the user has made the post. The other posted data acquisition module 108 acquires other posted data associated with the tree ID from the other posted data stored in the communication tool database DB2. When the user makes a post to a certain tree in a certain thread, the other posted data acquisition module 108 acquires other posted data of other posts belonging to the certain tree. The other posted data acquisition module 108 does not acquire other posted data of other posts belonging to other trees in the certain thread. Modification Example 4 is different from Modification Example 3 in that the other posted data used by the answer data generation module 104 in order to acquire the answer data is the other posted data of the other posts belonging to the same tree, but the method itself of generating answer data based on the other posted data may be the same as in Modification Example 3.

The work support system 1 according to Modification Example 4 acquires the other posted data of the other posts in the same tree as that of a post of interest among a plurality of other posts made on the communication tool. This enables the work support system 1 to acquire the answer data in consideration of the topic serving as the process leading up to the post. The work support system 1 more easily outputs an answer desired by the user. For example, in a thread to which a large number of posts have been made, there may be other posts that are completely irrelevant to the post made by the user. Meanwhile, the other posts in the same tree as that of the post made by the user are likely to relate to the post made by the user, and hence the AI can generate an answer that closely relates to the post made by the user.

6-5. Modification Example 5

For example, the answer desired by the user may differ depending on the attribute of the user. The attribute of the user is a classification of the user. The attribute of the user may be the type of work for which the user is responsible. Examples of the attribute of the user may include an industry of the organization to which the user belongs, the department of the user in the organization, a managerial position of the user, demographic information such as the gender or age of the user, and other information. For example, an answer desired by a user belonging to the development department and an answer desired by a user belonging to the sales department may differ from each other even when the users belong to the same organization. In addition, for example, an answer desired by a user with a managerial position and an answer desired by a user without a managerial position may differ from each other. Thus, the AI may generate answer data that also takes the attribute of the user into consideration.

The work support system 1 according to Modification Example includes the user attribute data acquisition module 109. The user attribute data acquisition module 109 acquires user attribute data indicating the attribute of the user who has made the post. In Modification Example 5, the user attribute data is stored in the user database DB1, and hence the user attribute data acquisition module 109 acquires the user attribute data from the user database DB1. The user attribute data may indicate any attribute including the above-mentioned examples. The user may designate the attribute indicated by his or her own user attribute data. The administrator in the organization to which the user belongs may designate the attribute of the user. The user attribute data may be stored in another computer other than the server 10 or an external information storage medium. The user attribute data acquisition module 109 may acquire the user attribute data from the other computer or the external information storage medium.

The answer data generation module 104 in Modification Example 5 causes the AI to generate answer data further based on the user attribute data. For example, the answer data generation module 104 inputs the user attribute data as the prompt for the AI. The AI calculates the embedded representation further based on the user attribute data as well as the posted data and the prompt data PD. The AI outputs the answer data indicating the answer corresponding to the embedded representation. The answer data generation module 104 acquires the answer data output from the AI. Processing in which the answer display module 105 outputs the answer based on the answer data may be the same as that in the at least one embodiment.

A method by which the answer data generation module 104 acquires the answer data based on the user attribute data is not limited to the above-mentioned example. It suffices that the answer data generation module 104 uses the user attribute data in some way to cause the AI to generate answer data. For example, when the prompt data PD corresponding to the user attribute data is provided, the answer data generation module 104 may acquire the prompt data PD associated with the user attribute data and cause the AI to generate answer data based on the posted data and the prompt data PD. In another case, for example, when there are a plurality of AIs and an AI corresponding to each piece of user attribute data is provided, the answer data generation module 104 may select the AI associated with the user attribute data and cause the selected AI to generate answer data based on the posted data and the prompt data PD.

The work support system 1 according to Modification Example causes the AI to generate answer data further based on the user attribute data. This enables the work support system 1 to output an answer corresponding to not only the post made by the user but also the attribute of the user who has made the post. The work support system 1 more easily outputs an answer desired by the user. For example, when the user attribute data indicates the department of the user, the AI can generate answer data corresponding to the content of the work for which the department of the user who has made the post is responsible. When the user attribute data indicates the managerial position of the user, the AI can generate answer data corresponding to the managerial position of the user who has made the post.

6-6. Modification Example 6

For example, the AI may generate answer data by referring not only to knowledge accumulated in the AI itself but also to a database managed by the work support system 1. The data storage unit 100 in Modification Example 6 stores various databases in which the work data described in Modification Example 3 is stored. For example, the databases store work data indicating company regulations, work data indicating an in-house dictionary, work data indicating a schedule, work data indicating emails, work data indicating various kinds of information relating to customers, or other work data. Those databases are referred to and updated by functions other than the communication tool among the functions included in the work support system 1.

The answer data generation module 104 in Modification Example 6 generates answer data by causing the AI to refer to at least one of a plurality of databases managed by the work support system 1. For example, the answer data generation module 104 inputs the posted data and the prompt data PD to the AI. The AI calculates the embedded representation based on the input, and selects at least one of the plurality of databases based on the embedded representation. The AI outputs the answer data including the work data stored in the selected database. The answer data indicates all or part of the content indicated by the work data. The AI may modify the content of the work data and generate answer data indicating the modified content. Processing in which the answer display module 105 outputs the answer based on the answer data may be the same as that in the at least one embodiment.

The work support system 1 according to Modification Example 6 generates answer data by causing the AI to refer to at least one of a plurality of databases managed by the work support system 1. This enables the work support system 1 to output the answer data relating to the work of the user. For example, when the user posts a question relating to company regulations, the AI generates answer data by referring to the database on the company regulations, and hence the AI can generate answer data corresponding to the post of the user. Which database to be referred to by the AI for what kind of post is identified based on the embedded representation calculated by the AI. The AI can generate appropriate answer data based on the database corresponding to the content of the post.

6-7. Modification Example 7

For example, the user may designate a task to be executed by the AI in addition to the mention of the AI. In Modification Example 7, it is assumed that the mention of the AI is performed by inputting "@bot" in the same manner as in the at least one embodiment. The task to be executed by the AI is designated by the user by inputting a character string indicating the task after a specific symbol (for example, "#") different from that for the mention of the AI.

The work support system 1 according to Modification Example 7 includes the task identification module 110. The task identification module 110 identifies a task designated by the user who has made the post. For example, the task identification module 110 acquires task data indicating the task designated by the user. The task data indicates the character string of the task designated by the user. In Modification Example 7, the character string indicating the content of the task is input after the specific symbol "#", and hence the task data indicates the specific symbol "#" and the character string. For example, in a case of a task for the AI to machine-translate the post into English, the task data indicates "#TranslateIntoEnglish". In a case of a task for the AI to create a summary of the posts in the thread, the task data indicates "#CreateSummary".

For example, the user inputs the character string such as "#TranslateIntoEnglish" to designate the task of machine-translating the post of the user into English. When the user makes a post after designating the task, the user terminal 20 transmits the posted data to the server 10. The posted data acquisition module 101 of the server 10 acquires the posted data in the same manner as in the at least one embodiment. Data indicating the task may be data separate from the posted data.

For example, the task identification module 110 determines whether or not the specific symbol "#" for designating a task is included in the post indicated by the posted data. When the task identification module 110 determines that the specific symbol "#" is not included in the post, the task identification module 110 does not identify a task. In this case, answer data is generated by the AI in the same manner as in the at least one embodiment. When the task identification module 110 determines that the specific symbol "#" is included in the post, the task identification module 110 identifies the character string "TranslateIntoEnglish" following the specific symbol "#" as a task.

Tasks that can be designated by users may be defined in advance. In this case, the task identification module 110 may determine whether or not the specific symbol "#" and a character string defined as a task that can be designated by a user are included in the post, and may acquire the task data based on a result of the determination. A symbol other than "#" may be used to designate a task. The specific symbol for designating a task may be any symbol that differs from the symbol for a mention. The specific symbol for designating a task may be the same symbol (for example, "@") as the symbol for a mention. In this case, when the character string following the symbol is not the name of a user, the task identification module 110 may acquire the task data by regarding the character string as indicating a task.

In another case, the specific symbol may not be used to designate a task. In this case, when a post including "@bot"

indicating a mention of the AI is made, the task identification module 110 may perform language analysis on a body text of the post to identify a task, and acquire the task data indicating the task. For example, when tasks that can be designated by users are defined in advance, the task identification module 110 may determine whether or not any character string indicating a task defined in advance is included in the body text of the post, and acquire the task data based on a result of the determination. The task identification module 110 may acquire the task data based on an AI for task determination that is provided separately from the AI that generates answer data. In another example, information (for example, an image or text) for designating a task may be displayed on the communication tool screen SC. The user may designate a task by selecting at least one of a plurality of pieces of the information.

The answer data generation module 104 in Modification Example 7 causes the AI to generate answer data further based on the task data. For example, the answer data generation module 104 inputs the task data as the prompt for the AI. The AI calculates the embedded representation further based on the task data as well as the posted data and the prompt data PD. The AI outputs the answer data indicating the answer corresponding to the embedded representation. The answer data generation module 104 acquires the answer data output from the AI. Processing in which the answer display module 105 outputs the answer based on the answer data may be the same as that in the at least one embodiment.

A method by which the answer data generation module 104 acquires the answer data based on the task data is not limited to the above-mentioned example. It suffices that the answer data generation module 104 uses the task data in some way to cause the AI to generate answer data. For example, when the prompt data PD corresponding to the task data is provided, the answer data generation module 104 may acquire the prompt data PD associated with the task data and cause the AI to generate answer data based on the posted data and the prompt data PD. In another case, for example, when there are a plurality of AIs and an AI corresponding to each piece of task data is provided, the answer data generation module 104 may select the AI associated with the task data and cause the selected AI to generate answer data based on the posted data and the prompt data PD.

The work support system 1 according to Modification Example 7 causes the AI to generate answer data further based on the task designated by the user. This enables the work support system 1 to output an answer corresponding to not only the post made by the user but also the task designated by the user who has made the post. The work support system 1 more easily outputs an answer desired by the user. For example, when the user designates a task that the user wishes the AI to perform, the work support system 1 can cause the AI to perform the task desired by the user and generate answer data, thereby increasing the accuracy of the answer from the AI.

6-8. Modification Example 8

For example, the work support system 1 may be provided with a plurality of AIs. Each individual AI is trained with training data specialized for a specific task. For example, each individual AI may be subjected to retraining such as fine-tuning based on the training data specialized for a specific task. In Modification Example 8, there are provided three AIs, namely, an AI 1 specialized for machine translation, an AI 2 specialized for summary creation, and an AI 3 specialized for research. The number of AIs may be any number. For example, the number of AIs may be two, or may be four or more.

For example, the AI 1 has been trained with training data including sentences for training written in a specific language (for example, Japanese) and the sentences translated into another language (for example, English) different from the specific language. The AI 2 has been trained with training data including sentences for training and summaries of the sentences. The AI 3 has been trained with training data such as data from an Internet encyclopedia or data of an encyclopedia created by the organization to which the user belongs. It is assumed that the AI 1 to the AI 3 in a trained state are stored in the data storage unit 100.

For example, the user may not only mention the AI but also designate the AI to be caused to generate answer data. In Modification Example 8, the user mentions the AI by inputting a character string indicating the mention of the AI after the specific symbol "@" in the same manner as in the at least one embodiment. However, it is assumed that the character string indicates one of the plurality of AIs. To designate the AI 1, the user uses "bot1" as the character string. To designate the AI 2, the user uses "bot2" as the character string. To designate the AI 3, the user uses "bot3" as the character string. It is assumed that correspondence data indicating which character string corresponds to which AI is stored in advance in the data storage unit 100.

The work support system 1 according to Modification Example 8 includes the AI identification module 111. The AI identification module 111 identifies the AI designated by the user who has made the post among the plurality of AIs. The AI identification module 111 analyzes the posted data based on the correspondence data to identify the AI designated by the user. For example, when it is determined that a mention of the AI has been made, the AI identification module 111 refers to a numerical value at the end of the character string of the mention, to thereby identify the AI designated by the user. When the character string of the mention is "@bot1", the AI identification module 111 identifies the AI 1. When the character string of the mention is "@bot2", the AI identification module 111 identifies the AI 2. When the character string of the mention is "@bot3", the AI identification module 111 identifies the AI 3.

A specific symbol other than that for the mention may be used to designate an AI. In this case, the user may designate an AI by inputting information indicating the AI to process the task after another symbol (for example, "%") separately from "@bot" indicating the mention of the AI. For example, information (for example, an image or text) for designating an AI may be displayed on the communication tool screen SC. The user may designate an AI by selecting at least one of a plurality of pieces of the information. The user may designate a plurality of AIs.

The answer data generation module 104 in Modification Example 8 causes the AI designated by the user among the plurality of AIs to generate answer data. For example, when the AI 1 is identified by the AI identification module 111, the answer data generation module 104 causes the AI 1 among the AI 1 to the AI 3 to generate answer data. When the AI 2 is identified by the AI identification module 111, the answer data generation module 104 causes the AI 2 among the AI 1 to the AI 3 to generate answer data. When the AI 3 is identified by the AI identification module 111, the answer data generation module 104 causes the AI 3 among the AI 1 to the AI 3 to generate answer data. Modification Example 8 is different from the at least one embodiment in that any one of the plurality of AIs generates answer data, but the processing in which the AI generates answer data may be the same as that in the at least one embodiment. The processing in which the answer display module 105 outputs an answer based on the answer data may also be the same as that in the at least one embodiment.

The work support system 1 according to Modification Example 8 causes the AI designated by the user among a plurality of AIs to generate answer data. This enables the work support system 1 to not only generate answer data based on the post made by the user but also cause the AI designated by the user to generate answer data. The work support system 1 more easily outputs an answer desired by the user. For example, when the user designates an AI that the user wishes to process a task from among a plurality of AIs, the work support system 1 can cause the AI desired by the user to process the task and cause the AI to generate answer data, thereby increasing the accuracy of the answer from the AI.

6-9. Other Modification Examples

For example, two or more of Modification Examples 1 to 8 may be combined. The answer data generation module 104 may cause the AI to generate answer data only based on the posted data, not based on the prompt data PD. In this case, the work support system 1 does not include the prompt data acquisition module 103. The work support system 1 that does not include the prompt data acquisition module 103 can also solve the issue of increasing the convenience of the user because the user can cause the AI to generate answer data from the communication tool such as the conversation threading. Accordingly, the work support system 1 that does not include the prompt data acquisition module 103 is also included in the scope of the present disclosure.

For example, the functions described as being implemented by the server 10 may be implemented by the user terminal 20. In this case, it suffices that the functions are implemented by a browser script or an application installed on the user terminal 20. For example, the respective functions may be distributed to a plurality of computers, or may be implemented by a single computer.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A work support system, comprising at least one processor configured to:
   acquire posted data indicating a post that has been made on a communication tool that supports work;
   determine, based on the posted data, whether a mention of an artificial intelligence (AI) has been made;
   acquire prompt data indicating a prompt provided in advance;
   cause, when it is determined that the mention has been made, the AI to generate answer data indicating an answer to the post based on the posted data and the prompt data; and
   display the answer on the communication tool based on the answer data.

2. The work support system according to claim 1, wherein the at least one processor is configured to:
   acquire place data indicating a place in which the post has been made on the communication tool; and cause the AI to generate the answer data based on the place data.

3. The work support system according to claim 1, wherein the at least one processor is configured to:
   acquire work data relating to work of a user who has made the post; and
   cause the AI to generate the answer data further based on the work data.

4. The work support system according to claim 1, wherein the at least one processor is configured to:
   acquire other posted data indicating another post different from the post; and
   cause the AI to generate the answer data further based on the other posted data.

5. The work support system according to claim 4,
   wherein the another post comprises a plurality of other posts, and
   wherein the at least one processor is configured to acquire other posted data of other posts in the same tree as a tree of the post, among the plurality of other posts made on the communication tool.

6. The work support system according to claim 1, wherein the at least one processor is configured to:
   acquire user attribute data indicating an attribute of a user who has made the post; and
   cause the AI to generate the answer data further based on the user attribute data.

7. The work support system according to claim 1, wherein the at least one processor is configured to generate the answer data by causing the AI to refer to at least one of a plurality of databases managed by the work support system.

8. The work support system according to claim 1, wherein the at least one processor is configured to determine, based on the posted data, whether the mention of the AI has been made by the same method as a method of mentioning a user using the communication tool.

9. The work support system according to claim 1, wherein the at least one processor is configured to:
   identify a task designated by a user who has made the post; and
   cause the AI to generate the answer data further based on the task.

10. The work support system according to claim 1,
    wherein the AI comprises a plurality of AIs, and
    wherein the at least one processor is configured to:
    identify one of the plurality of AIs that is designated by a user who has made the post; and
    cause the one of the plurality of AIs that is designated by the user to generate the answer data.

11. A work support method, comprising:
    acquiring posted data indicating a post that has been made on a communication tool that supports work;
    determining, based on the posted data, whether a mention of an artificial intelligence (AI) has been made;
    acquiring prompt data indicating a prompt provided in advance;
    causing, when it is determined that the mention has been made, the AI to generate answer data indicating an answer to the post based on the posted data and the prompt data; and
    displaying the answer on the communication tool based on the answer data.

12. A non-transitory information storage medium having stored thereon a program for causing a computer to:
    acquire posted data indicating a post that has been made on a communication tool that supports work;

determine, based on the posted data, whether a mention of an artificial intelligence (AI) has been made;

acquire prompt data indicating a prompt provided in advance;

cause, when it is determined that the mention has been made, the AI to generate answer data indicating an answer to the post based on the posted data and the prompt data; and display the answer on the communication tool based on the answer data.

* * * * *